United States Patent
Ford

[11] 3,824,767
[45] July 23, 1974

[54] DEMISTOR

[75] Inventor: Reginald G. Ford, Tulsa, Okla.

[73] Assignee: Cities Service Oil Company, Tulsa, Okla.

[22] Filed: May 17, 1973

[21] Appl. No.: 361,091

[52] U.S. Cl............................. 55/20, 55/29, 55/80, 55/82, 55/269, 260/676 H
[51] Int. Cl............................ B01d 5/00, C07c 9/00
[58] Field of Search............. 48/196; 55/20, 29, 30, 55/31, 80, 82, 163, 183, 184, 185, 195, 268, 269; 62/9, 11, 12; 260/676 H

[56] References Cited
UNITED STATES PATENTS

| | | | |
|---|---|---|---|
| 2,671,322 | 3/1954 | Barry | 260/676 H |
| 3,490,201 | 1/1970 | Colvin et al. | 55/268 |
| 3,537,270 | 11/1970 | Blanchard | 62/12 |

Primary Examiner—Charles N. Hart
Attorney, Agent, or Firm—Elton F. Gunn

[57] ABSTRACT

Demisting of a flowing gas stream under superatmospheric pressure is facilitated by chilling the gas in a liquid separation zone by means of a heat exchanger. To provide a cooling fluid which is circulated through the exchanger, part of the superatmospheric gas stream from the liquid separation zone is passed through a flow restricting orifice and then into the exchanger while the interior of the latter is maintained at a substantially lower pressure than that which exists upstream of the orifice, hence effecting cooling of the gas by the rapid expansion thereof. Accordingly, a portion of the gas that is demisted is then used as a coolant in the demisting process and as a consequence thereof no extraneous refrigerant or refrigerating equipment is required.

10 Claims, 3 Drawing Figures

DEMISTOR

BACKGROUND OF THE INVENTION

In the processing or handling of a normally gaseous substance, problems are sometimes associated with containment in the gas of an entrained mist, or a vapor at saturated conditions, of a normally liquid substance, e.g., water.

One instance where such a problem exists is in the production of natural gas from subterranean formations. The production stream often consists of natural gas which contains an entrained mist of salt water droplets. A gas-liquid separator is used to break the droplets from the gas stream whereupon the gas is sent to a sales line and the water is discarded.

In some instances salty mist droplets are so fine that they pass through the separator and on into the gas sales line, i.e., the liquid droplets or vapor are not effectively removed by the separator. Problems which may result include salt plating on metering plates — causing false measurements, salt corrosion in lines, and damage to gas compressor installations which result from formation of salt crystals. It has been common practice in such cases to use mechanical demistors which comprise a series of baffles that are supposed to condense the small droplets of the mist by impingement upon the baffles. Unfortunately, however, mechanical demistors have not always proven satisfactory and there has been a long felt need for improved techniques for demisting a gas so that the results obtained with a mechanical demistor can at least be improved, or the use of a mechanical demistor entirely obviated.

Therefore, one object of the present invention is to provide improved removal from a gas stream of a normally liquid substance which is present in the gas as a mist or a vapor at saturated conditions.

Another object of the invention is to facilitate the removal of a normally liquid substance, which is present in a flowing gas stream in the form of a vapor or mist, by chilling the gas in order to effect condensation of the liquid to form droplets which can be readily separated from the flowing gas stream.

Still another object is to utilize a portion of the gas being dried as a refrigerant in order to effect chilling and removal of liquid in accordance with the previously stated object.

Yet another object is to provide improved demisting of natural gas which contains an entrained mist of salt water droplets.

Even another object is to provide an improved demistor for gases which contain undesired quantities of a normally liquid substance in the form of a mist or vapor.

Other objects and advantages of the invention will become apparent from the following description, and it will be understood that the invention is not necessarily limited to the specific embodiments shown and described hereinafter.

SUMMARY OF THE INVENTION

A flowing stream of mist or vapor-containing gas at superatmospheric pressure is passed into a separator vessel which bounds a horizontally elongated liquid separation zone having an enlarged cross-section with respect to an inlet conduit through which the mist-containing gas is introduced into the vessel. A heat exchanger is located within the separator vessel so that the interior thereof, i.e., the liquid separation zone, is exposed to the exterior of the exchanger. Placement of the exchanger within the separator vessel is such that flow of gas through the liquid separation zone is over the exchanger and hence in contact with the exterior surface thereof. The heat exchanger is provided with a fluid inlet and a fluid outlet which lead respectively to and from the interior of the exchanger. An interconnecting conduit extends from the outlet end of the separator vessel to the inlet of the heat exchanger and a flow-restricting orifice is located in the interconnecting conduit between the two. Means is also provided for removing liquid from the separating vessel which accumulates therein, e.g., a drain cock located in the bottom thereof or a liquid-activated trap.

In operation, the interior of the heat exchanger is maintained at a pressure substantially below that of the gas contained within the separator vessel, e.g., the exchanger discharges against atmospheric pressure or else the outlet of the exchanger can be connected to the suction side of a pump or compressor. Under these conditions, the discharge of a portion of the dried gas stream into the heat exchanger, through the flow-restricting orifice, results in a rapid expansion of the gas and hence a sharp lowering in the temperature thereof. By circulation of this expansion-cooled gas through the exchanger, the liquid separating zone of the vessel is cooled and the temperature of the gas passing through it is lowered to the point where substantial condensation of the entrained mist is effected. Upon condensation of the liquid on the surface of the exchanger, large droplets form thereon and then fall into the bottom of the vessel where they collect as a body of liquid that can be drained off and disposed of.

Since the gas being processed serves as the refrigerant in the present invention, the need for extraneous refrigerant or refrigerating equipment is therefore obviated.

DESCRIPTION OF PREFERRED EMBODIMENTS

Figure 1:
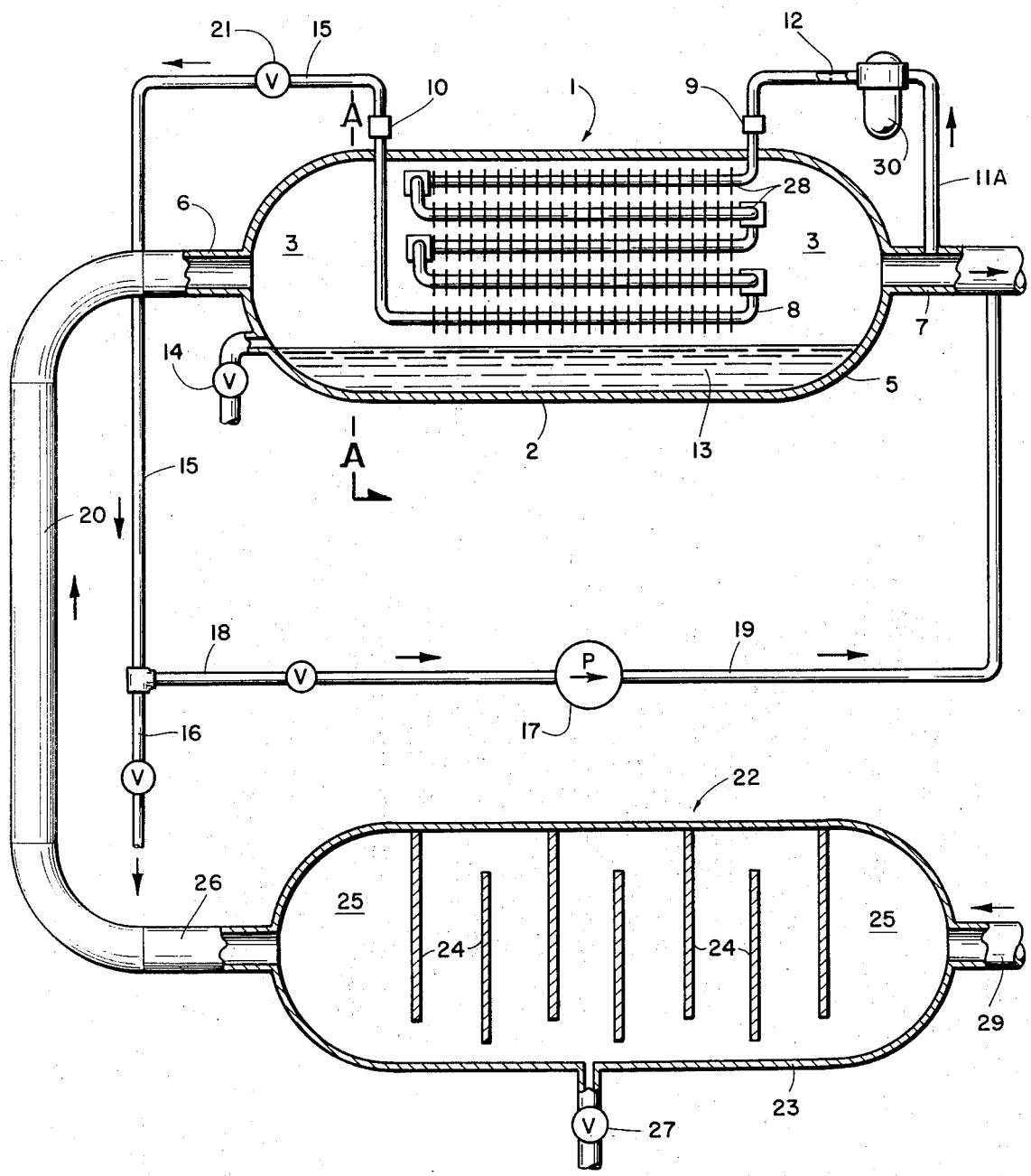
FIG. 1 is a somewhat diagrammatic representation of apparatus, parts of which are shown in section, that can be used in the practice of the invention.

Referring to FIG. 1, a horizontally elongated separator vessel is generally represented at 1 and has a shell 2 which bounds a liquid separation zone 3 that extends from the inlet end 4 to the outlet end 5 of vessel. The inlet end of the vessel is provided with an inlet conduit 6 for wet gas, i.e., a gas which contains a mist, or a vapor at saturated conditions, of a normally liquid substance such as water. The outlet end of the vessel is provided with an outlet conduit 7 for removal of gas after it has been partially dried by condensation and collection of the entrained liquid within the vessel 1. The entire vessel, including the inlet and outlet conduits, is designed and constructed to withstand superatmospheric pressures, e.g., 5–50 atmospheres.

Figure 2:
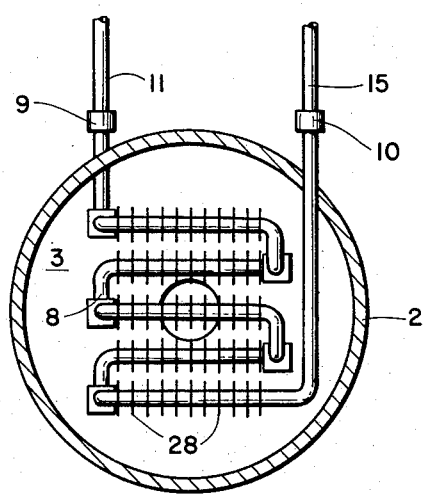
FIG. 2 is a cross-sectional view along the line A—A of the demistor of FIG. 1.
Figure 3:
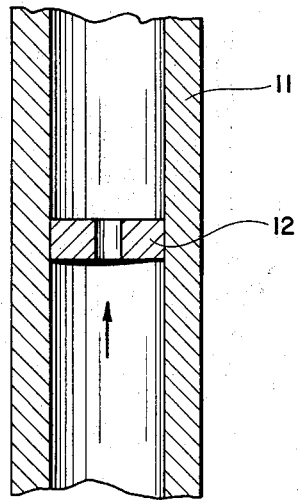
FIG. 3 is an enlarged view of the flow-restricting orifice employed with the apparatus of FIG. 1.

A heat exchanger 8 is used to effect condensation and collection of a liquid that is entrained within a flowing gas stream that is passed through the separator vessel. As shown in FIGS. 1 and 2, the heat exchanger 8 is located within the liquid separation zone 3 of the vessel and is adapted for flow of the gas stream, introduced through conduit 6, over the exterior surface of the exchanger, i.e., the exchanger is positioned substantially coaxially with respect to the liquid separation zone 3 and also substantially coaxially with respect to flow of the gas stream from the inlet end 4 to the outlet end 5 of the vessel 1.

Using the heat exchanger 8, the gas which flows through the separation vessel 1 can be chilled to effect condensation and collection of liquid that is entrained in the gas. In accordance with FIG. 1, the heat exchanger is provided with a fluid inlet, represented at 9, and a fluid outlet, represented at 10, which lead, respectively, to and from the interior of the exchanger. An interconnecting conduit 11 leads between the outlet conduit 7 of vessel 1 and the inlet 9 of the heat exchanger. A flow-restricting orifice 12 is located within the interconnecting conduit between the outlet conduit 7 and the exchanger inlet 9. A liquids trap 30 is located in conduit 11 ahead of the orifice 12. The purpose of trap 30 is to remove entrained liquid droplets which might be entrained in the gas stream passing through conduit 11, hence preventing obstruction of the orifice by freezing of the liquid. The liquids trap can be of a variety which removes liquids from the gas by mechanical separation or by absorption, the latter being preferred, e.g., the liquids trap can be a refrigerant drier.

In operation, a wet gas, such as natural gas which contains a mist of salt water droplets, is passed into the separation vessel under superatmospheric pressure. The gas passes over the exterior of heat exchanger 8 and condensation of the entrained liquid thereon is effected by transfer of heat from the gas and liquid through the wall of the exchanger and into a chilled gas being passed through the interior of the exchanger. (The source and manner of chilling the gas that is passed through the exchanger will be discussed in detail hereinafter.) As the entrained vapor or mist condenses upon the exchanger, larger droplets form and grow in size until they fall off the surface of the exchanger and into the bottom of the liquid separation zone where they form a body of liquid 13 that can be drained off through a cock 14.

It will be understood that when the entrained liquid in the gas is salt water, initial condensation is, of course, in the form of "pure" or "fresh" water, but this "pure" condensate has an affinity for salt and effects the dissolution thereof so that collection and removal of both water and salt from the gas is effectively accomplished by means of the present invention.

As was previously indicated, dried gas is discharged from the separation vessel through outlet conduit 7, and in accordance with FIG. 1, an interconnecting conduit 11 leads between this conduit and the inlet 9 of the exchanger 8. The purpose of this arrangement is to provide a transfer line whereby dried gas leaving the liquid separation zone 3 can be fed through the exchanger 8 as a refrigerant, and the need for flow-restricting orifice 12 is thereby more easily understood, i.e., it permits rapid expansion and hence substantial lowering of the temperature of the gas which passes through it. Accordingly, a portion of the dried gas which passes out of the liquid separation zone 3 can be utilized as the refrigerant fluid in exchanger 8 and any need for extraneous refrigerant or refrigerating equipment is thereby obviated.

It will be apparent that if expansion cooling of the dried gas is to be accomplished upon passing through orifice 12, it is necessary that the pressure in conduit 11 and the exchanger 8 be substantially lower than exists upstream of the orifice, i.e., lower than the superatmospheric pressure that exists in the outlet conduit 7 or the lower end 11a of conduit 11. A preferred manner by which this effect can be accomplished is by connection of the fluid outlet 10 of the heat exchanger to a discharge conduit 15 which leads either to a region of atmospheric pressure through line 16 or to the suction side of a pump or compressor 17 through line 18. More specifically, line 16 can lead to a burner or flare, for instance, when the dried gas passed through the heat exchanger is natural gas of the like, or else can be pumped through line 19 into conduit 7 which leads from the separation vessel and into a production sales line, not shown. In the latter case the gas which is passed through the exchanger is fully recycled and is subsequently disposed of in the originally intended purpose, e.g., if the gas being processed is natural gas or the like, the gas leaving exchanger 8 through discharge conduit 15 is recycled back to the production sales line.

To advantage, means can be provided for regulating the flow of dried, chilled gas through the heat exchanger so that the temperature thereof can be adjusted and controlled. Therefore, a throttling valve, as is represented at 21 in FIG. 1, can be employed for the purpose, and it will be understood that this valve can be automatically regulated by means of a thermostat, preferably adjustable, for establishing and maintaining a desired temperature. In FIG. 1, valve 21 is located downstream of the heat exchanger, but it will be appreciated that the valve can be located upstream of the exchanger if desired.

In FIG. 1, use of the refrigerated separation vessel 1 is shown in use with a mechanical entrainment separator for liquids, generally represented at 22. The mechanical separator has a shell 23 capable of withstanding superatmospheric pressures and contains a series of baffles 24 upon which droplets of entrained liquid can impinge and condense into larger droplets which then fall to the bottom of the collection zone 25. In accordance with FIG. 1, the mechanical separator 22 interconnects with the refrigerated separator vessel 1 through line 20, and partially deliquified gas is discharged from the mechanical separator through line 26. Liquid which collects in the mechanical separator can be drained off through a cock represented at 27.

Use of a mechanical separator such as is represented at 22 in FIG. 1 is an optional though preferable feature. In accordance with FIG. 1, the purpose of the mechanical separator is to initially trap and separate any large droplets of liquid that might be carried into the system, while entrained within the gas stream which enters the separator 22 through inlet conduit 29. Accordingly, a substantial portion of the entrained liquid can be separated from a wet gas stream before the stream is passed through the refrigerated separator represented at 1. Operating in this fashion, the refrigerated separator can be used to reduce the liquid content of the gas to below saturated conditions, and in fact a very dry gas can be produced in this manner.

As shown in FIG. 1, the heat exchanger 8 is of the tube bundle variety and is provided with fins 28. Where preferred, tubes without fins can be employed and it will also be appreciated that the exchanger can be of a type other than the tubed variety, e.g., hollow plates or baffles through which the refrigerant can be circulated can be used instead of tubes.

Whereas FIG. 1 shows the interconnecting conduit 11 leading from conduit 7 into the heat exchanger, conduit 11 can instead lead into the exchanger from any point in the system where the gas has already been dried by means of the exchanger and while the gas is at a superatmospheric pressure sufficient to effect the expansive cooling thereof by passage through a flow-restricting orifice. For instance, conduit 11 can lead into the exchanger from the outlet end 5 of vessel 1, or from line 20.

It should also be noted in FIG. 1 that the body of liquid condensate 13 can be maintained at a level which facilitates flow of the gas to be dried over the heat exchanger, i.e., the liquid level can be maintained just beneath the bottom of the exchanger by location of the drain conduit 28 above the bottom of the vessel 1 and beneath the bottom of the exchanger as shown.

Conventional valves 14 and 17 are shown as drain cocks in FIG. 1, but it will be appreciated that liquid-activated traps, e.g., bucket traps, could be used instead of ordinary valves in order to automatically maintain a desired level of liquid condensate in vessel 1 or separator 22.

The present invention has been described with particular reference to drying natural gas which contains an entrained mist of salt water droplets because the invention is especially useful in such applications. However, it will be appreciated by those skilled in the art that this invention can also be employed for drying other gases, e.g. air or process gases, which contain liquids other than water that are normally liquid and readily subject to condensation by chilling, e.g., light hydrocarbons, alcohols, ketones, etc.

Finally, it will be understood that although the present invention has been described in detail with respect to particular apparatus, apparatus arrangements, materials, operating conditions, and the like, even other embodiments will become apparent which are within the spirit and scope of the invention defined in the following claims.

What is claimed is:

1. Apparatus for removing an entrained mist or vapor of a liquid from a flowing gas stream which comprises:

a. a horizontally elongated separator vessel having inlet and outlet ends and adapted to contain a gas at superatmospheric pressures,
    b. an inlet conduit through which a stream of wet gas is introduced into the inlet end of said vessel,
    c. an outlet conduit through which a dried stream of gas is removed from the outlet end of said vessel,
    d. a heat exchanger located within said vessel and having a fluid inlet and a fluid outlet which lead respectively to and from the interior of the exchanger, said exchanger being adapted for flow over the exterior surface thereof of a gas stream which is passed through said vessel,
    e. an interconnecting conduit which leads between the outlet end of said separation vessel and the fluid inlet of the heat exchanger,
    f. a flow restricting orifice located within said interconnecting conduit between the outlet end of said vessel and said fluid inlet of the heat exchanger, and
    g. means for removing condensed liquid from said separator vessel.

2. Apparatus as in claim 1 and including means for regulating the flow of fluid through said interconnecting conduit.

3. Apparatus as in claim 1 wherein the heat exchanger is a tube bundle aligned in the path of gas flow through the separator vessel.

4. Apparatus as in claim 1 and further comprising a mechanical entrainment separator for liquid droplets, said entrainment separator being interconnected with said separator vessel upstream of said inlet conduit.

5. Apparatus as in claim 1 and further comprising a fluid discharge conduit which leads from the fluid outlet of the heat exchanger, a gas compressor having an inlet and an outlet and wherein said discharge conduit from the heat exchanger leads to the inlet of the compressor, and a return line from the outlet of the compressor to the outlet end of the separator vessel.

6. The apparatus of claim 1 and further comprising a liquids trap located in said interconnecting conduit ahead of said orifice.

7. In a process wherein a contained flowing stream of gas containing a mist or vapor of a liquid is passed at superatmospheric pressure into one end of a horizontally elongated liquid separation zone wherein said liquid is condensed and removed from said gas stream and a dried flowing gas stream is discharged from the other end of said zone at superatmospheric pressure, the improvement for increasing the amount of liquid removed from the gas stream within said zone which comprises passing a portion of the dried gas stream through a flow-restricting orifice and thence into the confines of a heat exchanger wherein the pressure is substantially lower than that of the dried gas stream ahead of said orifice, said heat exchanger being located within said separation zone, cooling said flowing gas stream by passage of the resulting expansion-cooled dried gas through said heat exchanger, and condensing and collecting liquid from said gas stream within the liquid separation zone by the cooling of the gas.

8. A process as defined in claim 7 wherein the gas stream that is passed into the separator is natural gas which contains a mist of salt water droplets.

9. A process as defined in claim 7 wherein the pressure of the dried gas stream leaving the separation zone is within the range of about 50 psig to about 250 psig.

10. A process as defined in claim 8 wherein the portion of dried gas that is passed through the heat exchanger is recovered, compressed and returned to the dried gas stream that is discharged from the liquid separation zone.

* * * * *